(12) United States Patent
Chang et al.

(10) Patent No.: US 6,625,614 B1
(45) Date of Patent: Sep. 23, 2003

(54) IMPLEMENTATION FOR EFFICIENT ACCESS OF EXTENDED ATTRIBUTE DATA

(75) Inventors: Joon Chang, Austin, TX (US); Amy Yi-Mei Shi, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 203 days.

(21) Appl. No.: 09/656,520

(22) Filed: Sep. 7, 2000

(51) Int. Cl.[7] .............................................. G06F 17/30
(52) U.S. Cl. .................................................. 707/103 R
(58) Field of Search ....................... 707/1, 2, 100–102, 707/202, 103 R; 709/217; 711/156

(56) References Cited

U.S. PATENT DOCUMENTS

| | | | | |
|---|---|---|---|---|
| 5,412,808 A | * | 5/1995 | Bauer ............................. | 707/1 |
| 5,617,568 A | * | 4/1997 | Ault et al. ................... | 707/101 |
| 5,628,007 A | * | 5/1997 | Nevarez ...................... | 707/102 |
| 5,742,817 A | * | 4/1998 | Pinkoski ........................ | 707/1 |
| 5,940,841 A | * | 8/1999 | Schmuck et al. ........... | 707/205 |
| 6,055,527 A | * | 4/2000 | Badger et al. ................. | 707/1 |
| 6,119,118 A | * | 9/2000 | Kain et al. ..................... | 707/1 |

OTHER PUBLICATIONS

Yousef A. Khalidi and Michael N. Nelson Titled "Extensible File Systems in Spring" SIGOPS '93 Copyright 1993 ACM 0–89791–632–8/93 /0012.*

* cited by examiner

*Primary Examiner*—Diane D. Mizrahi
(74) *Attorney, Agent, or Firm*—Robert A. Voigt, Jr.; Winstead Sechrest & Minick P.C.; Casimer K. Salys

(57) ABSTRACT

A method, computer program product and data processing system for accessing extended attributes. An extended attribute descriptor in a dinode may be read to determine if there exists extended attributes associated with a file system object that is associated with the dinode. An extended attribute descriptor points to a dinodex associated with the dinode if there exists an extended attribute associated with the file system object. The dinodex may then be read to retrieve the extended attritbutes stored either inside or outside the dinodex. However, if there is no extended attribute associated with that particular file system object, then the extended attribute descriptor comprises a null value and does not point to a dinodex associated with the dinode.

67 Claims, 4 Drawing Sheets

410 Reading an extended attribute descriptor in a particular dinode within a dinode page, where the dinode page comprises a plurality of dinodes

420 Extended attribute data? — No → 430 End

Yes ↓

440 Reading a particular dinodex within a dinodex page associated with the particular dinode, where the dinodex page comprises a plurality of dinodexes, where the particular dinodex comprises extended attribute data associated with the particular dinode or comprises an address of the extended attribute data stored outside the particular dinodex

IMPLEMENTATION FOR EFFICIENT ACCESS OF EXTENDED ATTRIBUTE DATA

TECHNICAL FIELD

The present invention relates to the field of computer data file systems, and more particularly to an implementation, with expandable storage size for control information, that allows for the efficient access of extended attributes without compatibility problems.

BACKGROUND INFORMATION

Computer operating systems, e.g., DOS and Unix, and the mechanism for creating, storing and retrieving data files and directories associated with the operating systems are generally well known. A file system is a collection of management structures which impose a logical structure upon a storage device, typically a disk storage device, in order to let an arbitrary set of users construct and store files of user data in a way that allows later retrieval of that data using file names. File systems have evolved which allow the application programmer to focus on the functionality of the application program thereby leaving the operating system the task of creating files and directories, allocating disk space and file retrieval schemes.

Typically, an operating system, in response to a function call from an application, creates a file for the data retrieved, e.g., text, graphics, video, from the memory and stores the data at a specific location within a data storage unit, e.g., hard drive, file server. Furthermore, the operating system typically stores a set of information commonly referred to as standard attributes, e.g., file name, data and time of most recent access to file, date and time of last revision, size, location, creator, access control information, in an inode. An inode may be a particular block or structure in a file system. Inodes stored on a disk, e.g., hard drive, are commonly referred to as dinodes. A file system object is typically associated with a particular dinode. The particular dinode comprises access control information which must be read first in order to access the file system object associated with that particular dinode.

As application programs have become more complex, the operating system is required to track other information which may be referred to as extended attributes. Although these extended attributes may be included in the list of standard attributes, it would unnecessarily increase the size and complexity of the set of standard attributes because many extended attributes are application program specific.

Prior art file systems reserve specific fields for each specific extended attribute in the dinode representing the file system object, e.g., files, directories or links, to an application, e.g., a database unaware application. These fields store extended attribute data if the amount of extended attribute data is small or stores a pointer which points to a storage address of the extended attribute data outside the dinode. Unfortunately, these dinode structures are fixed in size which limits the amount of control information, e.g., the types of extended attributes, that maybe stored in the dinode of the file system object. Furthermore, the replacement of control information, e.g., extended attribute types, requires the modification of the dinode structure which results in compatibility problems in successive versions of the file system.

Prior art file systems avoid the limitation problem of the dinode by using a single field to store a pointer which points to a single, variable byte stream where each extended attribute is stored as a substring of the extended attribute string. This results in a very inefficient update problem when extended attributes are either modified or deleted since the extended attribute string must be reconstructed to accommodate the changed size of the substring of the specific extended attribute. Furthermore, summary information of the extended attributes, e.g., number of extended attribute types, requires reading the summary information of each substring along the entire extended attribute string. This is a very inefficient process.

It would therefore be desirable to develop an implementation that allows for efficient access to extended attributes including summary information without any compatibility problems. It would further be desirable to allow for an expandable storage size of control information without any compatibility problems.

SUMMARY

The problems outlined above may at least in part be solved in some embodiments by providing a one-to-one mapping between dinodes within a dinode page and dinodexes within a dinodex page. Standard attributes associated with file system objects are stored in dinodes which are stored on a disk storage device, e.g., hard drive, disk units. Extended attributes associated with file system objects are stored in dinodexes which are stored on a disk storage device, e.g., disk units. Each dinode comprises a plurality of fields where one of the plurality of fields comprises an extended attribute descriptor. An extended attribute descriptor points to the associated dinodex if there exists an extended attribute associated with the file system object, i.e., file system object associated with the dinode comprising the extended attribute descriptor in question. However, if there is no extended attributed associated with the file system object, i.e., file system object associated with the dinode comprising the extended attribute descriptor in question, then the extended attribute descriptor comprises a value of null and does not point to an associated dinodex.

In one embodiment, a method for efficiently accessing extended attributes comprises the step of determining whether a particular file system object has an extended attribute data associated with the particular file system object. This is accomplished by reading an extended attribute descriptor in a particular dinode associated with the particular file system object. The particular dinode is located within a dinode page. The method further comprises the step of reading a particular dinodex to access the extended attribute data associated with the particular file system object if the particular file system object has extended attribute data associated with it. The particular dinodex is associated with the particular dinode.

In another embodiment of the present invention, the dinodex page comprises at least one dinodex. Each of the at least one dinodex comprises a plurality of control lines and a plurality of data lines. The number of the plurality of control lines is expandable by reallocating one or more of the plurality of data lines to one or more control lines.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 4 is a flowchart depicting a method for an efficient access to extended attributes without any compatibility problems.

DETAILED DESCRIPTION

The present invention comprises a method, computer program product, data processing system for accessing extended attributes. In one embodiment of the present invention a method comprises the step of reading an extended attribute descriptor in a particular dinode associated with a particular file system object. The particular dinode is located within a dinode page where the dinode page comprises at least one dinode. An extended attribute descriptor points to an associated dinodex if there exists an extended attribute associated with that particular file system object. However, if there is no extended attribute associated with that particular file system object, then the extended attribute descriptor comprises a value of null and does not point to an associated dinodex. If there exists an extended attribute associated with that file system object, then the method further comprises the step of reading a particular dinodex associated with that particular dinode. The particular dinodex is located within a dinodex page, where the dinodex page comprises at least one dinodex. The particular dinodex comprises control information and data of the extended attribute associated with the particular file system object. In another embodiment of the present invention, each of the at least one dinodex comprises a plurality of control lines and a plurality of data lines. The number of the plurality of control lines is expandable by reallocating one or more of the plurality of data lines to one or more control lines.

Figure 1:
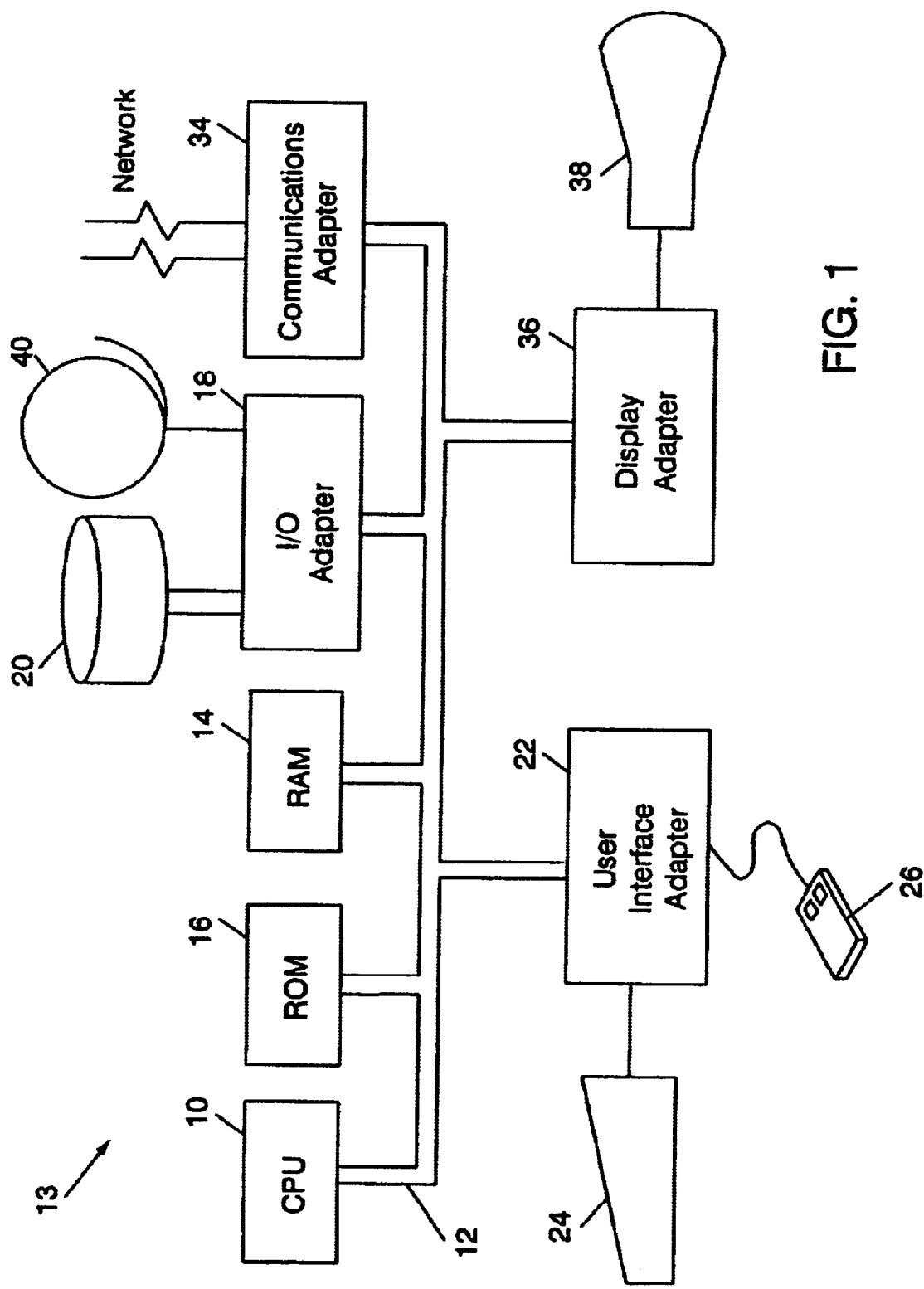
FIG. 1 illustrates a data processing system configured in accordance with the present invention.

FIG. 1—Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. I/O adapter 18 may be a small computer system interface ("SCSI") adapter that communicates with disk units 20 and tape drives 40. As stated in the Background Information section, a file system is a collection of management structures which impose a logical structure upon a storage device, e.g., disk units 20, in order to let an arbitrary set of users construct and store files of user data in a way that allows later retrieval of that data using file names. Communications adapter 34 interconnects bus 12 with an outside network enabling data processing system 13 to communication with other such systems. Input/Output devices are also connected to system bus 12 via a user interface adapter 22 and a display adapter 36. A display monitor 38 is connected to system bus 12 by display adapter 36. In this manner, a user is capable of inputting to system 13 through a keyboard 24 or a mouse 26 and receiving output from system 13 via display 38.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
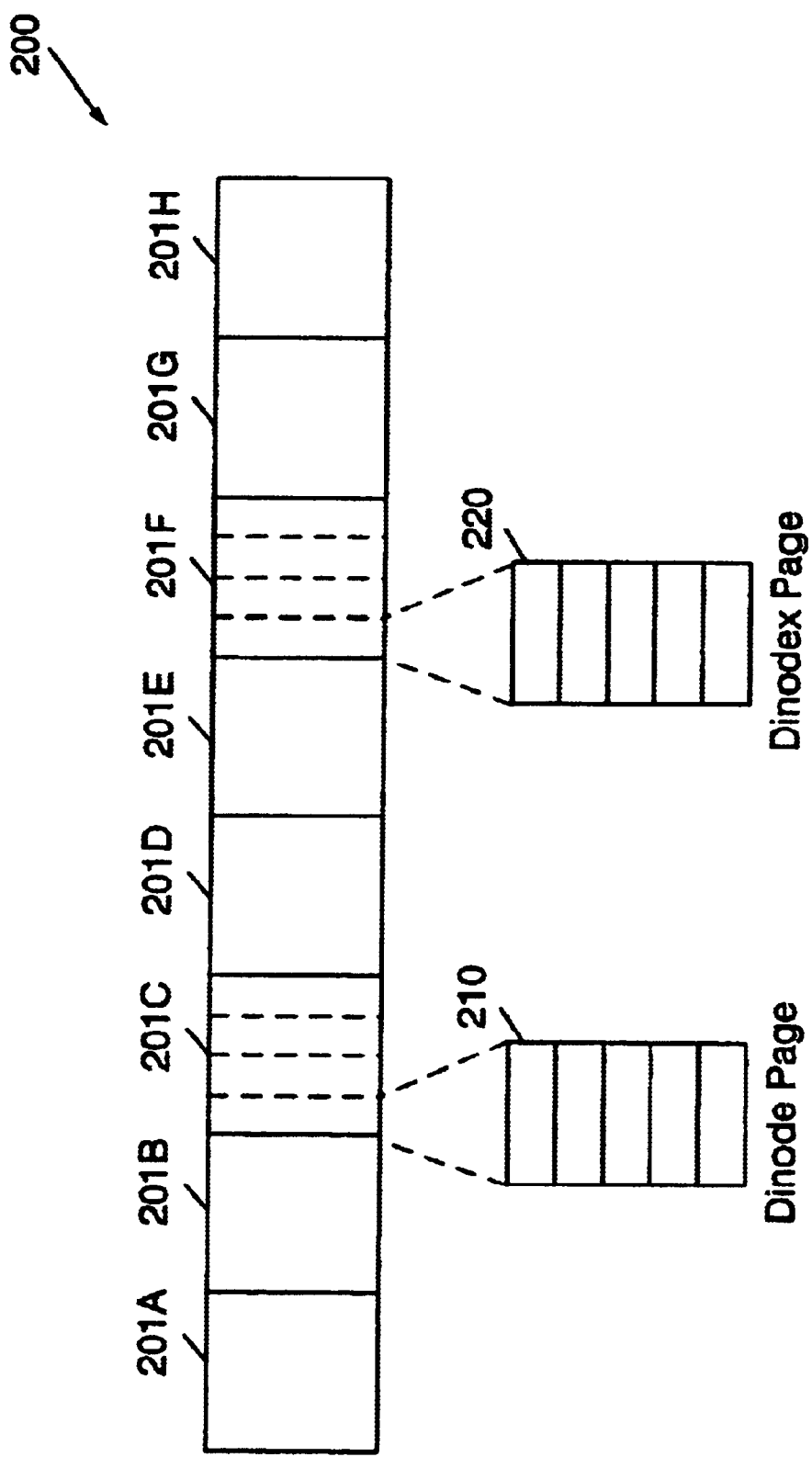
FIG. 2 illustrates an embodiment of a structure layout of a file system.

FIG. 2—Embodiment of a Structure Layout of a File System

FIG. 2 illustrates an embodiment of a file system 200 comprising a plurality of blocks 210A–H. As stated above, file system 200 is a collection of management structures which impose a logical structure upon a storage device, e.g., disk units 20, in order to let an arbitray set of users construct and store files of user data in a way that allows later retrieval of that data using file names. For example, files may be stored in one or more blocks which may be either allocated or free. Allocated blocks are those blocks which are currently being used to store a file or part of a file, if the file is larger than the block size. Free blocks are not in use and are available for storing a new file. The collection of all the free blocks in a file system is termed the free space. Blocks 201A–H may collectively or individually be referred to as blocks 201 or block 201, respectively. It is noted that file system 200 may comprise any number of blocks 201 and that FIG. 2 is used for illustrative purposes.

In at least one of the blocks 201, e.g., 201C, at least one dinode page 210 is stored. Furthermore, in at least one of the blocks 201, e.g., 201F, at least one dinodex page 220 is stored if at least one dinode in dinode page 210 has an extended attribute. A detailed explanation of dinode page 210 and dinodex page 220 is provided below.

Figure 3:
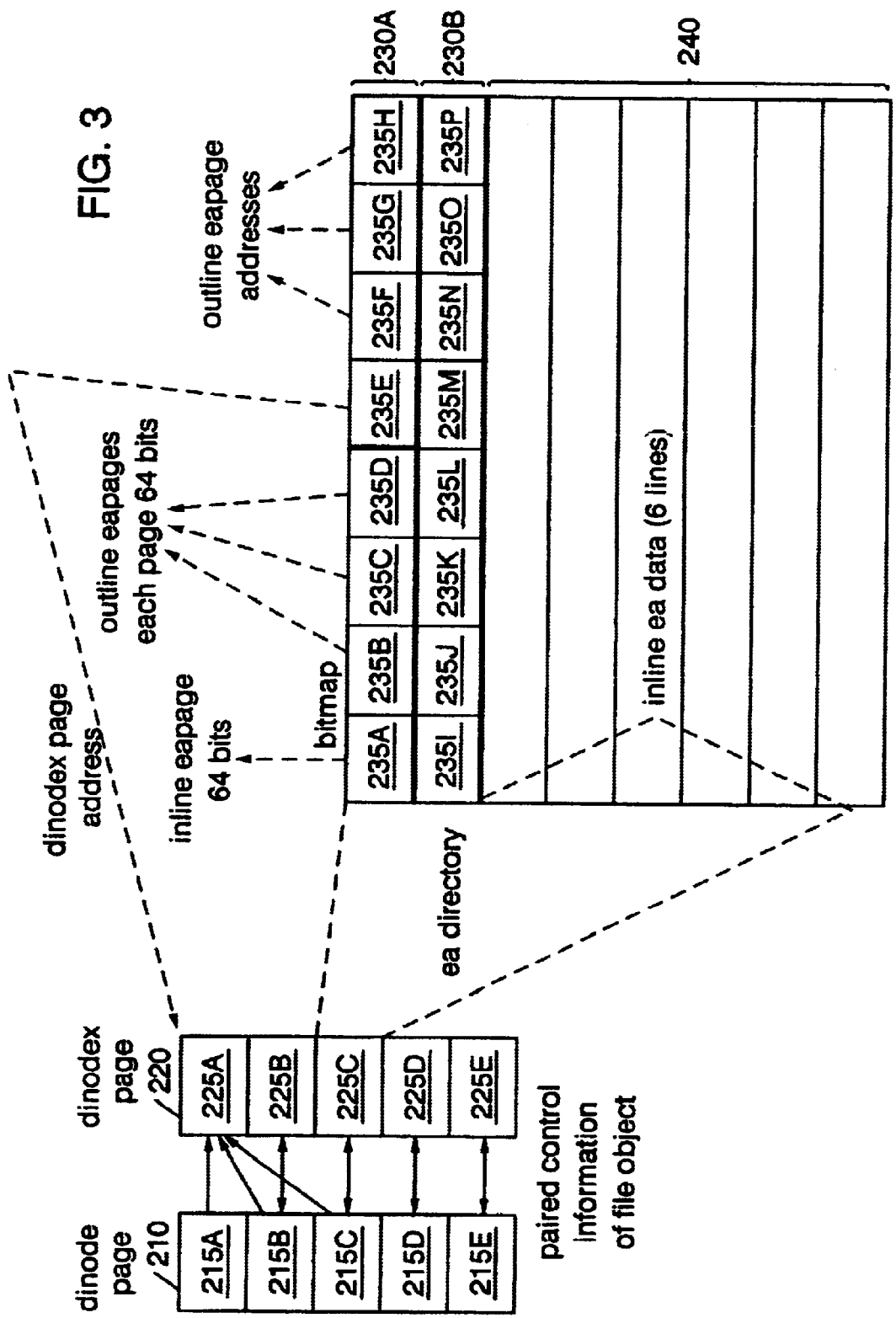
FIG. 3 illustrates an embodiment of a structure layout of a dinode page and a dinodex page.

FIG. 3—Embodiment of a Structure Layout of a Dinode Page and a Dinodex Page

FIG. 3 illustrates an embodiment of the present invention of a structure layout of dinode page 210 and dinodex page 220. A dinode page 210 comprises a plurality of dinodes 215A–E. A dinodex page 220 comprises a plurality of dinodexes 225A–E. Dinodes 215A–E may collectively or individually be referred to as dinodes 215 or dinode 215, respectively. Dinodexes 225A–E may collectively or individually be referred to as dinodexes 225 or dinodex 225, respectively. In one embodiment, the number of dinodes 215 is equal to the number of dinodexes 225. It is noted that dinode page 210 may comprise any number of dinodes 215 and that dinodex page 220 may comprise any number of dinodexes 225. It is further noted for clarity that dinode page 210 may only comprise one dinode 215 and that dinodex page 220 may only comprise one dinodex 225.

Referring to FIGS. 1 and 3, data processing 13 typically includes an operating system within a kernal, i.e., system memory, having a plurality of operating system functions. As stated in the Background Information section, the operating system typically stores a set of information commonly referred to as standard attributes, e.g., file name, date and time of most recent access to file, date and time of last revision, size, location, creator, access control information, associated with a file system object in an inode. Typically inodes are stored on a disk storage device, e.g., disk units 20, and are commonly referred to as dinodes 215. In an embodiment of the present invention, extended attributes associated with the file system object are stored in a dinodex 225. Dinodexes 225 are stored on a disk storage device, e.g., disk units 20. As stated above, a dinode page 210 comprises a plurality of dinodes 215. A dinodex page 220 comprises a plurality of dinodexes 225.

Referring to FIG. 3, dinode page 210 is associated with dinodex page 220. That is, there exists an association, i.e., one-to-one mapping, between each of the plurality of dinodes 215 with each of the plurality of dinodexes 225 where the number of dinodes 215 is equal to the number of dinodexes 225. For example, dinode 215A is associated with dinodex 225A. Dinode 215B is associated with dinodex 225B and so forth. Therefore, dinode 215 comprises standard attributes for a particular file system object and the associated dinodex 225 comprises extended attributes for the same particular file system object.

In an embodiment of the present invention, dinode 215 comprises a plurality of fields. In one of the plurality of fields is an extended attribute descriptor. An extended attribute descriptor points to the associated dinodex 225 if there are extended attributes associated with the file system object, i.e., file system object associated with the dinode 215 comprising the extended descriptor in question. However, if there is no extended attribute associated with the file system object, i.e., file system object associated with the dinode 215 comprising the extended descriptor in question, then the extended attribute descriptor comprises a value of null and does not point to an associated dinodex 225.

In an embodiment of the present invention, dinodex 225 comprises control information in a plurality of control lines 230A–B. Furthermore, dinodex 225 comprises an extended attribute data space per file system object in a plurality of data lines 240. Control lines 230A–B may collectively or individually be referred to as control lines 230 or control line 230, respectively. Each control line 230 comprises a plurality of units as illustrated by units 235A–H in control line 230A and units 235I–P in control line 230B. Units 235A–P may collectively or individually be referred to as units 235 or unit 235, respectively. It is noted that dinodex 225 may comprise any number of control lines 230 and data lines 240. It is further noted that control lines 230 may comprise any number of units 235.

Referring to FIG. 3, in control line 230A, the first four units 235A–D form what maybe referred to as a monitoring mechanism. Units 235E–H form what maybe referred to as a storage mechanism. In control line 230A, the first unit 235A monitors the plurality of data lines 240. That is, it detects which data lines of the plurality of data lines 240 are free or used for extended attribute data. In control line 230A, the next three units, 235B–D, monitor data line usage external to dinodex 225 whose addresses are stored in the last three units of control line 230A, i.e., 235F–H. For example, unit 235B monitors data line usage whose address information is stored in unit 235F. Unit 235C monitors data line usage whose address information is stored in unit 235G. Unit 235D monitors data line usage whose address information is stored in unit 235H. In control line 230A, the last three units 235F–H, comprise address information of extended attributes stored outside the dinodex 225 on a disk storage device, e.g., disk units 20. If the amount of extended attribute data exceeded the storage capability of the plurality of data lines 240, then the extended attribute data is stored outside the dinodex 225 on a disk storage device, e.g., disk units 20. The address location of where the extended attribute data is stored outside the dinodex 225 is stored in at least one of units 235F–H. Unit 235E stores the beginning address of dinodex page 225. It is noted that any number of unit(s) 235 may be used to monitor the plurality of data lines 240. It is further noted that any number of unit(s) 235 may be used to monitor the address information of any number of unit(s) 235. It is further noted that any number of unit(s) 235 may be used to store the beginning address of dinodex page 225.

Referring to FIG. 3, control line 230B comprises an extended attribute directory. An extended attribute directory comprises information about the extended attributes, e.g., extended attribute type, an extended attribute name, a length of an extended attribute data and an offset address of an extended attribute data, stored in units 235I–P. In an embodiment of the present invention, extended attribute directory comprises the summary information of extended attributes, i.e., those stored either in the plurality of data lines 240 or outside the dinodex page 220 whose address is stored in at least one of the pages in one of the control lines 230. By having the summary information in extended attribute directory, a quick inquiry may be achieved before reading extended attribute data. In an embodiment of the present invention, each unit 235 of extended attribute directory may comprise summary information for a particular type of extended attribute. For example, unit 235I may comprise summary information for a first type of extended attribute. Unit 235J may comprise summary information for a second type of extended attribute and so forth.

In an embodiment of the present invention, the number of control lines 230 are expandable. That is, control lines 230 may expand to additional control lines 230 by reallocating one or more of the data lines 240 to control lines 230. It is noted that the number of control lines 230 may expand to any number of additional control lines 230 until there are no more data lines in the dinodex 225. For example, two control lines 230 instead of just one control line, e.g., 230B, may comprise the extended attribute directory. The number of data lines 240 would then be reduced by one.

FIG. 4—Method for Efficient Access to Extended Attributes

FIG. 4 illustrates a method 400 according to an embodiment of the present invention. FIG. 4 is a method 400 for an efficient access to extended attribute data associated with file system objects referring to FIG. 4, in conjunction with FIGS. 1–3. In step 410, the extended attribute descriptor in one of the plurality of fields within a particular dinode 215 is read. A determination is then made in step 420 as to whether three exists extended attribute data associated with the file system object, i.e., file system object associated with the dinode 215 comprising the extended descriptor in question. As stated above, the extended attribute descriptor points to the associated dinodex 225 if there exists extended attribute data associated with the file system object, i.e., file system object associated with the dinode 215 comprising the extended descriptor in question. However, if there exists no extended attribute data associated with the file system object, i.e., file system object associated with the dinode 215 comprising the extended descriptor in question, then the extended attribute descriptor comprises a value of null and does not point to an associated dinodex 225.

If the extended attribute descriptor comprises a value of null, then method 400 is terminated at step 430. However, if the extended attribute descriptor points to the associated dinodex 225, then the associated dinodex 225 is read in step 440. Extended attribute directory 230B, which comprises information about the extended attributes, e.g., extended attribute type, an extended attribute name, a length of an extended attribute data and an offset address of an extended attribute data, may be read before reading extended attribute data. Furthermore, a particular unit 235 of extended attribute directory 230B comprising the summary information of a particular type of extended attribute may be read before reading the extended attribute data. Furthermore, a particular unit 235 of one of the plurality of control lines 230 may be read to determine which of the plurality of data lines 240 are free or used for extended attribute data. Furthermore, one or more units 235 of at least one of the plurality of control lines 230 may be read to obtain the address information of one or more other units 235 of at least one of the plurality of control lines 230 comprising the address of extended attribute data stored outside dinodex 225. Furthermore, one or more units 235 of at least one of the plurality of control lines 230 may be read to determine the address location of where the extended attribute data is stored outside the dinodex 225. Furthermore, a particular unit 235 of one of the plurality of control lines 230 may be read to determine the beginning address of dinodex page 225. Furthermore, extended attribute data may be read from either one or more of the plurality of data lines 240 or outside the dinodex 225 at an address location provided by one or more units 235 of at least one of the plurality of control lines 230.

Although the method, computer program product and data processing system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

It is noted that the headings are used only for organizational purposes and not meant to limit the scope of the description or claims.

What is claimed is:

1. A method for efficiently accessing extended attributes comprising the steps of:
   determining whether a particular file system object has an extended attribute data associated with said particular file system object by reading an extended attribute descriptor in a particular dinode associated with a particular file system object, wherein said particular dinode is located within a dinode page, wherein said dinode page comprises at least one dinode; and
   reading a particular dinodex to access said extended attribute data associated with said particular file system object if said particular file system object has extended attribute data associated with said particular file system object, wherein said particular dinodex is located within a dinodex page, wherein said dinodex page comprises at least one dinodex; and
   wherein the number of said at least one dinode is equal to the number of said at least one dinodex.

2. The method as recited in claim 1, wherein said extended attribute descriptor points to said particular dinodex if said particular dinodex comprises extended attribute data associated with said particular file system object or comprises an address of said extended attribute data associated with said particular file system object stored outside said particular dinodex.

3. The method as recited in claim 1, wherein each of said at least one dinodex comprises control information and an extended attribute data space.

4. The method as recited in claim 3, wherein each of said at least one dinodex comprises a plurality of control lines, wherein each of said plurality of control lines comprises a plurality of units, wherein each of said at least one dinodex comprises a plurality of data lines.

5. The method as recited in claim 4, wherein at least one of said plurality of units in at least one of said plurality of control lines monitors said plurality of data lines.

6. The method as recited in claim 4, wherein at least one of said plurality of units in at least one of said plurality of control lines detects which data lines of said plurality of data lines are free.

7. The method as recited in claim 4, wherein at least one of said plurality of units in at least one of said plurality of control lines detects which data lines of said plurality of data lines are used for extended attribute data.

8. The method as recited in claim 4, wherein at least one of said plurality of units in at least one of said plurality of control lines monitors data line usage whose address information is stored in at least one other unit in at least one of said plurality of control lines.

9. The method as recited in claim 4, wherein at least one of said plurality of units in at least one of said plurality of control lines comprises the address information of extended attributes stored outside said particular dinodex.

10. The method as recited in claim 4, wherein at least one of said plurality of units in at least one of said plurality of control lines comprises the starting address of said dinodex page.

11. The method as recited in claim 4, wherein at least one of said plurality of control lines comprises an extended attribute directory.

12. The method as recited in claim 11, wherein said extended attribute directory comprises information about said extended attributes.

13. The method as recited in claim 12, wherein said information comprises an extended attribute type.

14. The method as recited in claim 12, wherein said information comprises an extended attribute name.

15. The method as recited in claim 12, wherein said information comprises a length of an extended attribute data.

16. The method as recited in claim 12, wherein said information comprises an offset address of an extended attribute data.

17. The method as recited in claim 11, wherein the number of said plurality of control lines are expandable by reallocating one or more of said plurality of data lines to one or more control lines.

18. A computer program product embodied in a machine readable medium for efficiently accessing extended attributes comprising the programming steps of:
   determining whether a particular file system object has an extended attribute data associated with said particular file system object by reading an extended attribute descriptor in a particular dinode associated with a particular file system object, wherein said particular dinode is located within a dinode page, wherein said dinode page comprises at least one dinode; and
   reading a particular dinodex to access said extended attribute data associated with said particular file system object if said particular file system object has extended attribute data associated with said particular file system object, wherein said particular dinodex is located within a dinodex page, wherein said dinodex page comprises at least one dinodex, wherein each of said at least one dinodex comprises the following: control information, an extended attribute data space, a plurality of control lines and a plurality of data lines; and
   wherein the number of said at least one dinode is equal to the number of said at least one dinodex.

19. The computer program product as recited in claim 18, wherein said extended attribute descriptor points to said particular dinodex if said particular dinodex comprises extended attribute data associated with said particular file system object or comprises an address of said extended attribute data associated with said particular file system object stored outside said particular dinodex.

20. The computer program product as recited in claim 18, wherein each of said at least one dinodex comprises control information and an extended attribute data space.

21. The computer program product as recited in claim 20, wherein each of said at least one dinodex comprises a plurality of control lines, wherein each of said plurality of control lines comprises a plurality of units, wherein each of said at least one dinodex comprises a plurality of data lines.

22. The computer program product as recited in claim 21, wherein at least one of said plurality of units in at least one of said plurality of control lines monitors said plurality of data lines.

23. The computer program product as recited in claim 21, wherein at least one of said plurality of units in at least one of said plurality of control lines detects which data lines of said plurality of data lines are free.

24. The computer program product as recited in claim 21, wherein at least one of said plurality of units in at least one of said plurality of control lines detects which data lines of said plurality of data lines are used for extended attribute data.

25. The computer program product as recited in claim 21, wherein at least one of said plurality of units in at least one of said plurality of control lines monitors data line usage whose address information is stored in at least one other unit in at least one of said plurality of control lines.

26. The computer program product as recited in claim 21, wherein at least one of said plurality of units in at least one of said plurality of control lines comprises the address information of extended attributes stored outside said particular dinodex.

27. The computer program product as recited in claim 21, wherein at least one of said plurality of units in at least one of said plurality of control lines comprises the starting address of said dinodex page.

28. The computer program product as recited in claim 21, wherein at least one of said plurality of control lines comprises an extended attribute directory.

29. The computer program product as recited in claim 28, wherein said extended attribute directory comprises information about said extended attributes.

30. The computer program product as recited in claim 29, wherein said information comprises an extended attribute type.

31. The computer program product as recited in claim 29, wherein said information comprises an extended attribute name.

32. The computer program product as recited in claim 29, wherein said information comprises a length of an extended attribute data.

33. The computer program product as recited in claim 29, wherein said information comprises an offset address of an extended attribute data.

34. The computer program product as recited in claim 21, wherein the number of said plurality of control lines are expandable by reallocating one or more of said plurality of data lines to one or more control lines.

35. A data processing system, comprising:
a processor;
a memory unit operable for storing a computer program operable for accessing extended attributes;
an input mechanism;
an output mechanism;
a disk, wherein a dinode page is stored on said disk, wherein said dinode page comprises at least one dinode, wherein a dinodex page is stored on said disk, wherein said dinodex page comprises at least one dinodex, wherein the number of said least one dinode is equal to the number of said at least one dinodex;
a bus system coupling the processor to the memory unit, input mechanism, output mechanism, and disk, wherein the computer program is operable for performing the following programming steps:
determining whether a particular file system object has an extended attribute data associated with said particular file system object; and
reading a particular dinodex to access said extended attribute data associated with said particular file system object if said particular file system object has extended attribute data associated with said particular file system object.

36. The data processing system as recited in claim 35, wherein determining whether said particular file system object has an extended attribute data associated with said particular file system object is accomplished by reading an extended attribute descriptor in a particular dinode associated with a particular file system object.

37. The method as recited in claim 36, wherein said particular dinodex is associated with said particular dinode.

38. The data processing system as recited in claim 37, wherein said extended attribute descriptor points to said particular dinodex if said particular dinodex comprises extended attribute data associated with said particular file system object or comprises an address of said extended attribute data associated with said particular file system object stored outside said particular dinodex.

39. The data processing system product as recited in claim 35, wherein each of said at least one dinodex comprises control information and an extended attribute data space.

40. The data processing system product as recited in claim 39, wherein each of said at least one dinodex comprises a plurality of control lines, wherein each of said plurality of control lines comprises a plurality of units, wherein each of said at least one dinodex comprises a plurality of data lines.

41. The data processing system product as recited in claim 40, wherein at least one of said plurality of units in at least one of said plurality of control lines monitors said plurality of data lines.

42. The data processing system product as recited in claim 40, wherein at least one of said plurality of units in at least one of said plurality of control lines detects which data lines of said plurality of data lines are free.

43. The data processing system product as recited in claim 40, wherein at least one of said plurality of units in at least one of said plurality of control lines detects which data lines of said plurality of data lines are used for extended attribute data.

44. The data processing system product as recited in claim 40 wherein at least one of said plurality of units in at least one of said plurality of control lines monitors data line usage whose address information is stored in at least one other unit in at least one of said plurality of control lines.

45. The data processing system product as recited in claim 40, wherein at least one of said plurality of units in at least one of said plurality of control lines comprises the address information of extended attributes stored outside said particular dinodex.

46. The data processing system product as recited in claim 40, wherein at least one of said plurality of units in at least one of said plurality of control lines comprises the starting address of said dinodex page.

47. The data processing system product as recited in claim 40, wherein at least one of said plurality of control lines comprises an extended attribute directory.

48. The data processing system product as recited in claim 47, wherein said extended attribute directory comprises information about said extended attributes.

49. The data processing system product as recited in claim 48, wherein said information comprises an extended attribute type.

50. The data processing system product as recited in claim 48, wherein said information comprises an extended attribute name.

51. The data processing system product as recited in claim 48, wherein said information comprises a length of an extended attribute data.

52. The data processing system product as recited in claim 48, wherein said information comprises an offset address of an extended attribute data.

53. The data processing system product as recited in claim 40, wherein the number of said plurality of control lines are expandable by reallocating one or more of said plurality of data lines to one or more control lines.

54. A dinodex for storing extended attributes comprising:
   a plurality of control lines, wherein said plurality of control lines comprises control information; and
   a plurality of data lines, wherein said plurality of data lines comprises an extended attribute data space;
   wherein the number of said plurality of control lines are expandable by reallocating one or more of said plurality of data lines to one or more control lines.

55. The dinodex as recited in claim 54, wherein each of said plurality of control lines comprises a plurality of units.

56. The dinodex as recited in claim 55, wherein at least one of said plurality of units in at least one of said plurality of control lines monitors said plurality of data lines.

57. The dinodex as recited in claim 55, wherein at least one of said plurality of units in at least one of said plurality of control lines detects which data lines of said plurality of data lines are free.

58. The dinodex as recited in claim 55, wherein at least one of said plurality of units in at least one of said plurality of control lines detects which data lines of said plurality of data lines are used for extended attribute data.

59. The dinodex as recited in claim 55, wherein at least one of said plurality of units in at least one of said plurality of control lines monitors data line usage whose address information is stored in at least one other unit in at least one of said plurality of control lines.

60. The dinodex as recited in claim 55, wherein at least one of said plurality of units in at least one of said plurality of control lines comprises the address information of extended attributes stored outside said particular dinodex.

61. The dinodex as recited in claim 55, wherein at least one of said plurality of units in at least one of said plurality of control lines comprises the starting address of said dinodex page.

62. The dinodex as recited in claim 54, wherein at least one of said plurality of control lines comprises an extended attribute directory.

63. The dinodex as recited in claim 62, wherein said extended attribute directory comprises information about said extended attributes.

64. The dinodex as recited in claim 63, wherein said information comprises an extended attribute type.

65. The dinodex as recited in claim 63, wherein said information comprises an extended attribute name.

66. The dinodex as recited in claim 63, wherein said information comprises a length of an extended attribute data.

67. The dinodex as recited in claim 63, wherein said information comprises an offset address of an extended attribute data.

* * * * *

UNITED STATES PATENT AND TRADEMARK OFFICE
CERTIFICATE OF CORRECTION

PATENT NO. : 6,625,614 B1
DATED : September 23, 2003
INVENTOR(S) : Joon Chang and Amy Yi-Mei Shi It is certified that error appears in the above-identified patent and that said Letters Patent is hereby corrected as shown below:

Column 8,
Line 43, please replace "11" with -- 4 --.

Signed and Sealed this

Thirteenth Day of July, 2004

JON W. DUDAS
*Acting Director of the United States Patent and Trademark Office*